(12) United States Patent
Kimmich et al.

(10) Patent No.: US 7,976,061 B2
(45) Date of Patent: Jul. 12, 2011

(54) COMBUSTION CHAMBER UNIT FOR AN AIRBAG MODULE

(75) Inventors: Stephen Kimmich, Obernburg (DE); Björn Windhausen, Goldbach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/659,952

(22) Filed: Mar. 25, 2010

(65) Prior Publication Data
US 2010/0219622 A1    Sep. 2, 2010

Related U.S. Application Data

(63) Continuation of application No. PCT/EP2008/062827, filed on Sep. 25, 2008.

(30) Foreign Application Priority Data

Sep. 26, 2007 (DE) .......................... 10 2007 046 822

(51) Int. Cl.
B60R 21/26 (2006.01)
(52) U.S. Cl. ........................................ 280/741
(58) Field of Classification Search .................. 280/736, 280/740, 741, 742; 102/530, 531
See application file for complete search history.

(56) References Cited

U.S. PATENT DOCUMENTS

| | | | | | |
|---|---|---|---|---|---|
| 4,394,033 | A | * | 7/1983 | Goetz et al. ................... | 280/736 |
| 5,058,921 | A | * | 10/1991 | Cuevas ........................ | 280/741 |
| 5,226,669 | A | * | 7/1993 | Honda .......................... | 280/737 |
| 5,255,938 | A | * | 10/1993 | Brede et al. ................... | 280/736 |
| 5,397,544 | A | * | 3/1995 | Kobari et al. ................. | 422/167 |
| 5,451,381 | A | * | 9/1995 | Kishimoto et al. ............ | 422/305 |
| 5,482,312 | A | * | 1/1996 | Maurer ........................ | 280/728.1 |
| 5,556,131 | A | * | 9/1996 | Bender et al. ................. | 280/741 |
| 5,636,865 | A | * | 6/1997 | Riley et al. ................... | 280/741 |
| 5,702,494 | A | * | 12/1997 | Tompkins et al. ............. | 55/498 |
| 5,931,496 | A | * | 8/1999 | Brede et al. ................... | 280/741 |
| 6,412,816 | B1 | | 7/2002 | Gast et al. | |
| 7,240,916 | B2 | * | 7/2007 | Bierwirth et al. ............. | 280/736 |
| 7,404,574 | B2 | * | 7/2008 | Hirooka et al. ............... | 280/741 |
| 2004/0050281 | A1 | | 3/2004 | Hofmann et al. | |
| 2006/0043716 | A1 | * | 3/2006 | Quioc et al. ................... | 280/741 |
| 2006/0225280 | A1 | | 10/2006 | Bibo et al. | |
| 2007/0210567 | A1 | | 9/2007 | Krupp et al. | |

FOREIGN PATENT DOCUMENTS

| | | |
|---|---|---|
| DE | 202 13 555 U1 | 11/2003 |
| DE | 20 2004 011 078 U1 | 11/2004 |
| DE | 20 2004 009 749 | 12/2004 |
| DE | 20 2005 011 657 U1 | 1/2006 |
| DE | 10 2005 015 788 B3 | 10/2006 |
| WO | WO 97/17235 A1 | 5/1997 |
| WO | WO 00/44593 A1 | 8/2000 |

* cited by examiner

*Primary Examiner* — Faye M. Fleming
*Assistant Examiner* — Robert A Coker
(74) *Attorney, Agent, or Firm* — Foley & Lardner LLP (57) ABSTRACT

A combustion chamber assembly for an airbag module of a motor vehicle is provided. The combustion chamber assembly comprising a combustion chamber housing, which encloses a combustion chamber, and a housing receptacle, in which the combustion chamber housing is to be disposed such that the combustion chamber housing with the outer surface thereof is running along an inner surface of the housing receptacle. Discharge regions being respectively provided in the combustion chamber housing and in the housing receptacle, said regions being spatially associated with one another such that gas generated in the combustion chamber may discharge through the discharge regions of the combustion chamber housing and the housing receptacle into the surroundings. At least one indentation is formed on the combustion chamber housing and/or on the housing receptacle.

18 Claims, 5 Drawing Sheets

COMBUSTION CHAMBER UNIT FOR AN AIRBAG MODULE

CROSS-REFERENCE TO RELATED PATENT APPLICATIONS

This application is a Continuation of International Application No. PCT/EP2008/062827, filed Sep. 25, 2008, which was published in German on Apr. 9, 2009 as WO 2009/043787A1. The foregoing International Application is incorporated herein by reference in its entirety.

BACKGROUND

The invention relates to a combustion chamber unit for an airbag module of a motor vehicle.

Such a combustion chamber unit comprises a combustion chamber housing enclosing a combustion chamber and a combustion chamber receptacle in which the combustion chamber housing is to be arranged, so that the combustion chamber housing abuts with an outer surface on an inner surface of the housing receptacle, wherein discharge openings are respectively provided on the one hand in the combustion chamber housing and on the other hand in the housing receptacle which discharge regions, by the arrangement of the combustion chamber housing in the housing receptacle as intended, are spatially associated to one another in such a way, e.g. overlapping each other in such a way, that gas generated in the combustion chamber can discharge through the discharge regions of the combustion chamber housing and of the housing receptacle to the surroundings in order to may inflate therewith the gas bag of the airbag module.

In the present case, the combustion chamber housing is an assembly group in which a propellant, in particular a solid propellant, may be comprised from which, after ignition by means of an associated ignition device, a gas can be generated with which a gas bag of the airbag module can be inflated in order to provide therewith a gas cushion for a person to be protected in the case of a crash. In order to enable a discharge of the gas generated in the combustion chamber to the surroundings, so that gas generated in the combustion chamber can be used for inflating the gas bag, the mentioned discharge regions, e.g. in the form of discharge openings, are provided in the combustion chamber housing.

By the arrangement of the combustion chamber or, respectively, to be precise, of the combustion chamber housing in an associated housing receptacle the combustion chamber can be held in a defined position in or at the motor vehicle. Further discharge regions, e.g. in the form of discharge openings, are provided in the housing receptacle so that the housing receptacle does not conflict with a discharge of the gases generated in the combustion chamber into a gas bag to be inflated, which discharge regions are spatially associated to the discharge regions on the combustion chamber housing in such a way that the gases released from the combustion chamber housing may continue flowing through the discharge regions on the housing receptacle in order to fill a gas bag, to be inflated, with gas.

It is not mandatory that the mutual discharge regions are exactly aligned with each other; depending on the one hand on the constructional design of the combustion chamber housing and on the other hand of the housing receptacle, an offset of associated mutual discharge regions can also be provided. It is important, however, that the mutual discharge regions are spatially arranged to one another in such a manner that gases generated in the combustion chamber housing may discharge through said discharge regions in order to fill an associated gas bag.

SUMMARY

The invention is based on the problem to provide a combustion chamber unit of the initially mentioned type which allows for a reliable positioning of the combustion chamber housing at the housing receptacle by simple means.

According to an exemplary embodiment of the invention, at least one indentation is formed on the combustion chamber housing and/or on the housing receptacle in such a way that an expansion space is defined in the area of this indentation between the outer surface of the combustion chamber housing and the inner surface of the housing receptacle, which expansion space, upon arranging the combustion chamber housing in the housing receptacle as intended (thus during the assembly of the combustion chamber unit) and by deformation of a section of the combustion chamber housing into said expansion space, is at least partially filled with material of said section of the combustion chamber housing.

By the fact that the combustion chamber housing and the associated housing receptacle engage in each other in the expansion space defined by an indentation, a defined and permanent positioning of these two assembly groups with respect to each other is enabled. The combustion chamber housing is thus fixed in the housing receptacle in a defined manner.

The discharge regions of the combustion chamber housing and of the housing receptacle, which discharge regions are associated with one another, can be, on the one hand, discharge openings existing from the beginning or, on the other hand, regions of the combustion chamber housing and/or of the housing receptacle, respectively, in which regions discharge openings are only created by the pressure occurring upon combustion of a propellant in the combustion chamber housing. In particular, it can be intended that discharge openings are present on the housing receptacle right from the beginning whereas the associated discharge openings in the combustion chamber housing are only created by the pressure acting on the walls of the combustion chamber housing and occurring upon chemical transformation of a propellant provided in the combustion chamber housing into a gas serving for inflation of a gas bag.

Indeed, a gas generator screen insert is already known from DE 20 2005 011 657 U1 which in cross section is formed in the shape of a circular ring and comprises notches running inwards for the creation of expansion spaces; however, no deformable region of another component of a gas generator should be deformed into these expansion spaces, but they rather serve the supply of gas to the disperse openings. The compensation of tolerances is thereby enabled by the fact that the screen insert is designed as an open ring.

The combustion chamber housing, as regards its outer dimensions, can be dimensioned with respect to the inner dimensions of the housing receptacle in such a way that the inner surface of the housing receptacle, upon the arrangement of the combustion chamber housing in the housing receptacle, exerts a pressure directed inwards on the outer surface of the combustion chamber housing and the combustion chamber housing in at least one section is thus, under this pressure, deformed into the expansion space provided for this purpose. To be precise, the housing receptacle to be arranged in the combustion chamber housing may therefore comprise an oversize in its outer dimensions with respect to the inner dimensions of the housing receptacle along at least one spatial direction so that, upon inserting the combustion chamber housing in the housing receptacle, a pressure directed inwards is exerted on the combustion chamber housing in order to compensate said oversize whereupon the mentioned at least one section of the combustion chamber housing is deformed into an associated expansion space.

Thereby, the deformation of the combustion chamber housing can thus be concentrated on such sections of the combustion chamber housing which are respectively deformable into an associated expansion space that the combustion chamber housing, outside such sections, with its outer surface respectively abuts on the inner surface of the housing receptacle in a defined manner. A rest of the combustion chamber housing on the housing receptacle area by area counteracts a deformation of the combustion chamber housing outside the above-mentioned sections.

The indentation provided for the formation of an expansion space may, e.g. be provided as depression on the inner surface of the housing receptacle into which depression a section of the combustion chamber housing is deformable. On the other hand, the at least one indentation may also be formed by a depression on the outer surface of the combustion chamber housing into which depression a section of the combustion chamber housing itself is deformable, wherein said section of the combustion chamber housing directly borders the depression or forms a part of the boundary wall of said depression, respectively.

According to an exemplary embodiment of the invention, the combustion chamber housing comprises a tubular shell and is to be arranged in the housing receptacle whose inner surface abuts on the outer surface of the tubular shell—except such sub-regions in which the combustion chamber housing or the housing receptacle comprise an indentation for the definition of an expansion space. The combustion chamber housing may thereby be in particular insertable into the housing receptacle along the tube axis. In this case, a respective indentation preferably extends along the tube axis and at least along a part of the length of the tubular shell, if applicable along the complete length of the shell.

In a respective indentation as well as the section of the combustion chamber housing to be deformed into preferably no discharge regions or openings, respectively, are formed so that the designated deformation of a section of the combustion chamber housing does not result in an undefined position of the discharge regions or discharge openings, respectively.

The combustion chamber housing, for a deformability of at least one section of the combustion chamber housing into an expansion space designated therefore, may be constructed at least in sections plastically and/or elastically deformable.

The combustion chamber housing thereby needs not be integrated in a gas generator together with associated further components, as e.g. an ignition device, so that the housing receptacle is formed by a specific generator housing. It may rather also be intended that the combustion chamber is directly and separately or independently from further components of a gas generator arranged in a receptacle of a module housing at or in which furthermore the gas bag to be inflated is provided, or the combustion chamber may be provided in a vehicle environment specifically designed therefore as housing receptacle, e.g. a region of a dash board or of a lateral door structure.

BRIEF DESCRIPTION OF THE DRAWINGS

Further details and advantages of the invention will become apparent by the following description of embodiments on the basis of the Figures.

FIG. 1b shows a cross section through a housing receptacle for the combustion chamber of FIG. 1a.

FIG. 3 shows a further embodiment of the combustion chamber of FIG. 2a.

FIG. 4b shows a longitudinal section through the arrangement of FIG. 4a.

DETAILED DESCRIPTION

Figure 1A:
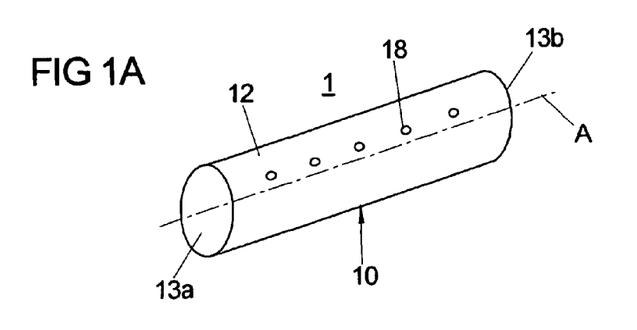
FIG. 1a shows a combustion chamber housing of a combustion chamber for an airbag module in perspective view.

FIG. 1a shows in perspective view a housing 10 of a combustion chamber 1 for an airbag module in whose interior a propellant, in particular a so-called solid charge, is to be arranged by means of which after ignition a gas can be generated through chemical processes, which gas is used to inflate a gas bag of the airbag module. This one forms, in an inflated state, a gas cushion for a person to be protected.

The combustion chamber housing 10 is tubular shaped in the embodiment, comprising an outer surface (shell surface 12) which forms a cylindrical surface and extends between a first front side 13a and a second front side 13b of the housing 10 along a tube axis A.

In the combustion chamber housing 10 a plurality of discharge regions distributed on the shell surface 12 in the form of discharge openings 18 is provided through which gas generated in the combustion chamber 1, thus in the space enclosed by the combustion chamber housing 10, may discharge to the surroundings in order to allow for inflating a gas bag of an airbag module therewith.

Figure 1B:
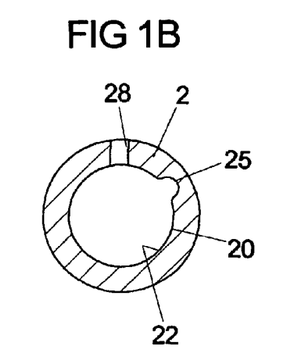
Figure 1C:
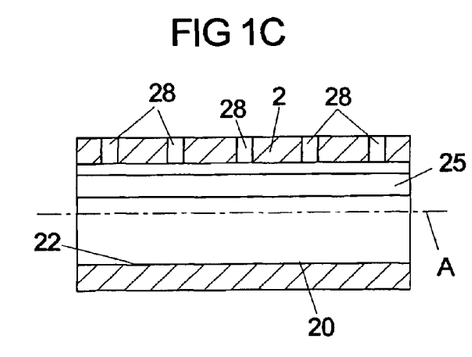
FIG. 1c shows a longitudinal section through the housing receptacle of FIG. 1b.
Figure 1D:
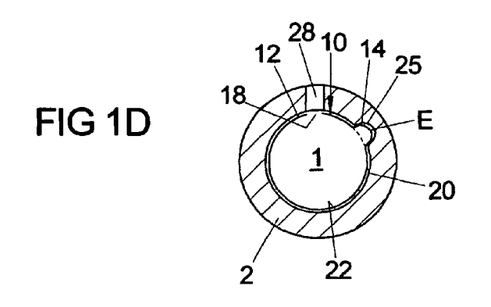
FIG. 1d shows a combustion chamber of FIG. 1a arranged in the housing receptacle of FIGS. 1b and 1c.

The combustion chamber 1 or its combustion chamber housing 10, respectively, is designated for the arrangement in a housing receptacle 2, compare FIGS. 1b and 1c, which housing receptacle therefore has a receptacle region 20 comprising an inner surface 22 which is adapted to the shell surface 12 of the combustion chamber housing so that the combustion chamber housing 10 with its outer shell surface 12 may abut on the inner surface 22 of the receptacle region 20 of the housing receptacle 2 when the combustion chamber 1 is inserted into the housing receptacle 2, i.e. that the combustion chamber housing 10 is inserted in the receptacle region 20 as depicted in FIG. 1d. Therefore, the inner surface 22 of the receptacle region 20 also extends along a cylindrical surface. The insertion of the combustion chamber housing 10 into the receptacle region 20 of the housing receptacle 2 may e.g. be carried out by inserting the combustion chamber 1 along its tube axis A into the receptacle region 20 whereupon the combustion chamber housing 10 moves along the longitudinal axis L of the receptacle region 20.

As can be seen from FIGS. 1b, 1c and 1d the receptacle region 20 of the housing receptacle 2 comprises an indentation 25 extending along its longitudinal axis L in the form of a longitudinally extending groove so that the inner surface 22 of the receptacle region 20 differs from its cylindrical or in the cross section circular shape along said indentation 25.

According to FIG. 1d, the indentation 25 defines an expansion space E into which a section 14 of the combustion chamber housing 10 can be deformed when the combustion chamber 1 (for assembly) is inserted into the receptacle region 20 of the housing receptacle 2. The deformation of a section 40 of the combustion chamber 10 upon insertion of the combustion chamber housing into the receptacle region 20 is thereby initiated in that the combustion chamber 1 in its cross section, in the embodiment thus in its radial extend with respect to the tube axis A, comprises a certain oversize with respect to the receptacle region 20, in the embodiment thus with respect to the inner diameter of the receptacle region 20. Hereby, the outer shell surface 12 of the combustion chamber housing 10, upon insertion of the combustion chamber housing 10 into the receptacle region 20, lies firmly in the type of an interference fit on the inner surface 22 of the receptacle region 20 so that this inner surface 22 exerts a force on the outer shell surface 12 of the combustion chamber housing 10 inwards in radial direction—with respect to the tube axis A or the longitudinal axis L, respectively. Under the influence of this force the suitably thin walled combustion chamber housing 10, preferably comprised of metal, in particular of aluminum, copper or steel, has the tendency to deform. Therefore, the combustion chamber housing 10 is designed elastically or plastically deformable in at least in an area of a respective section 14 of the combustion chamber housing to be deformed.

Due to the fact that the combustion chamber housing 10, however, with its outer shell surface 12 almost completely abuts on the inner surface 22 of the receptacle region 20 the deformation of the combustion chamber housing 10 is carried out selectively in at least one section 14 which lies next to an expansion space E formed by the indentation 25 of the receptacle region 20, cf. FIG. 1d. The deformation of said section 14 thereby automatically reaches such a magnitude that subsequently the combustion chamber housing 10 with its outer shell surface 12 abuts on the inner surface 22 of the receptacle region 20 of the housing receptacle 2 without that thereby such great pressure forces are present which would result in a further deformation of said section 14 of the combustion chamber housing 10.

Expressed in other words, the outer shell surface 12 of the combustion chamber housing 10, upon its insertion into the housing receptacle 2, selectively nestles to the inner surface 22 of the receptacle region 20 at the same time as a section 14 of the combustion chamber housing 10 being deformed into the expansion space E formed by the indentation 22 of the receptacle region 20. Thus, tolerances for the available space can be compensated upon insertion of the combustion chamber 1 into the housing receptacle 2; and a defined rest of the outer shell surface 12 of the combustion chamber 1 on the inner surface 22 of the housing receptacle 2 is always ensured. Furthermore, the combustion chamber housing 10 is specifically aligned with respect to the housing receptacle 2 or its receptacle region 20 in circumferential direction so that discharge openings 18, 28 of the combustion chamber housing 10 and of the housing receptacle 20, which are associated to one another, are positioned in a defined manner to each other and keep this relative position even when respectively great pressures are present upon the generation of a gas in the interior of the combustion chamber 1.

During the generation of a gas in the interior of the combustion chamber housing 10 this one, under the influence of the pressure related to the gas generation, even more firmly abuts on the inner surface 22 of the receptacle region 20, wherein, however, no unintentional changes of the relative position of the combustion chamber 1 relative to housing receptacle 2 are caused since the combustion chamber 1 via its deformed section 14 engages in at least one indentation 25 on the inner surface 22 of the housing receptacle 2 in a positive locking manner. Thus, a permanent defined positioning of the discharge openings 18 of the combustion chamber relative to the discharge openings 28 of the housing receptacle is also ensured during operation of the combustion chamber 1. Thereby, it is in particular appropriate if the relatively thin walled and more easily deformable combustion chamber 1 always is in contact over the whole area with the enclosing inner surface 22 of the housing receptacle 2.

In this way, it is ensured that gas emerging through the discharge openings 18 of the combustion chamber housing 10 subsequently finds its way through the associated discharge openings 28 of the housing receptacle 2.

In spite of a single deformation 25 there may also be provided several indentations distributed along the circumference of the receptacle region 20 into which indentations a section 14 of the combustion chamber housing may (respectively) deform. Furthermore, the precise geometrical shape, the spatial position as well as the extent of said indentations 25 may be varied.

Further, if applicable, material weakenings, e.g. in the form of embossments, may be provided in the area of such sections 14 of the combustion chamber housing 10 which should respectively be deformed into an associated indentation 25 in order to improve a selective deformation of the combustion chamber housing 10 in specific sections 14.

The housing receptacle 2 is comprised of, compared to the combustion chamber housing 10, a more dimensionally stable material so that the combustion chamber housing 10 (including its deformable sections 14) may rest on the inner surface 22 of the receptacle region 20 (including its at least one indentation 25) wherein the housing receptacle 2 has to withstand in particular the pressure which occurs when a solid charge is converted into a pressure gas by chemical processes in the interior of the combustion chamber housing 10.

The housing receptacle is comprised e.g. of a suitable solid plastics or magnesium and may form, for example, a component of a module housing which further serves for receiving the gas bag to be inflated by the gases generated.

Figure 4A:
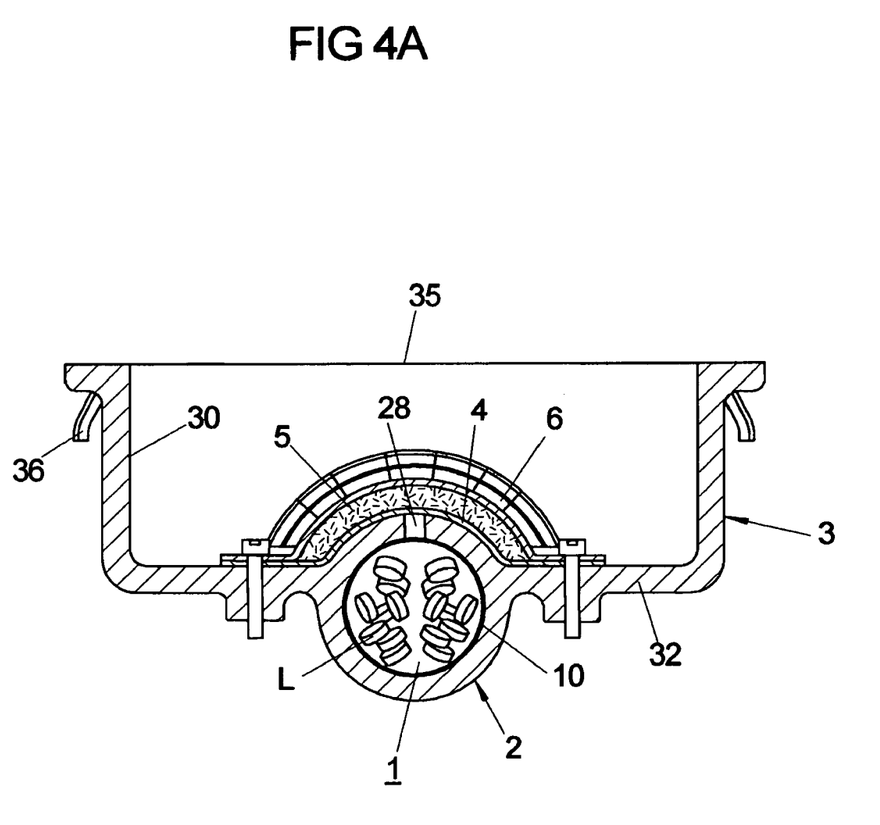
FIG. 4a shows a cross section through a module housing of an airbag module which at the same time forms a housing receptacle for receiving a combustion chamber.
Figure 4B:
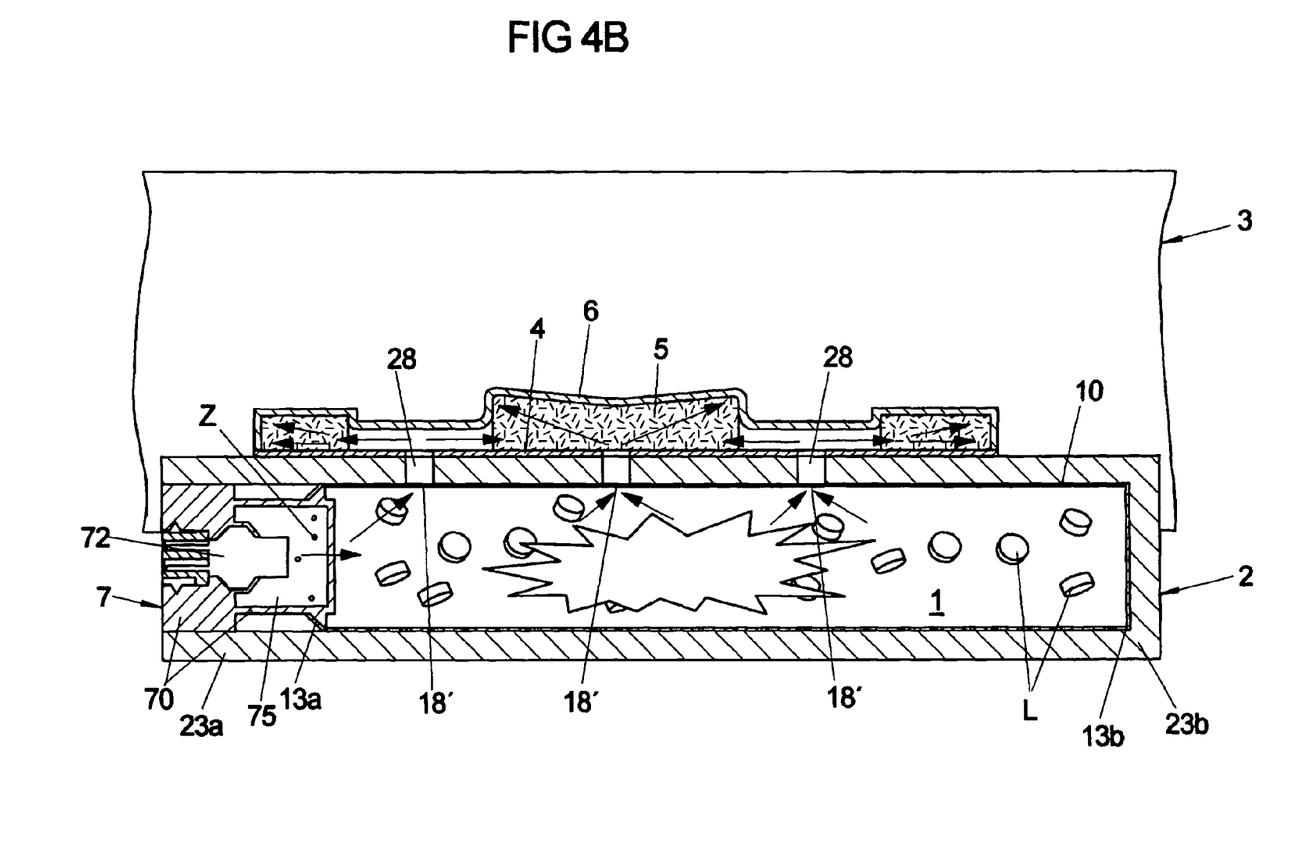

In this way, in particular, the combustion chamber 1 with the combustion chamber housing 10 and the propellant arranged therein, e.g. in the form of a solid, may be arranged separately of the further components of a gas generator serving the generation of gas and directly in a module housing which further servers for receiving components being independent from the gas generator, as e.g. a gas bag to be inflated, cf. the following annotations to FIGS. 4a and 4b.

Preferably, no discharge openings are provided in the sections 14 of the combustion body housing 10 to be deformed as well as in the associated indentations 25 into which a deformation of said sections 14 may occur.

Figure 2A:
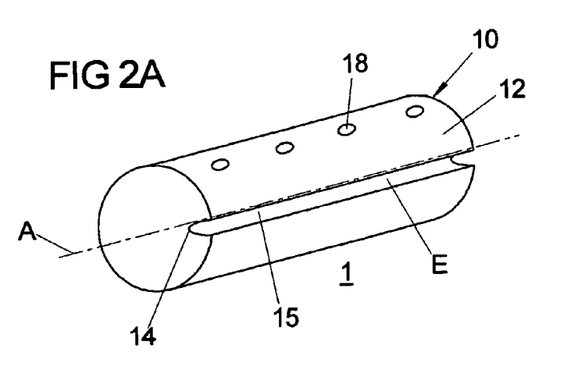
FIG. 2a shows a modification of the combustion chamber of FIG. 1a in perspective view.
Figure 2B:
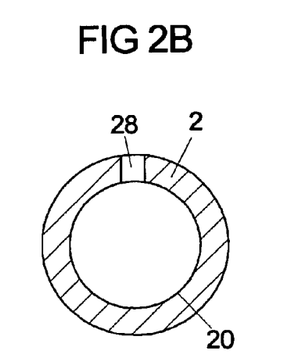
FIG. 2b shows a cross section through a housing receptacle for the combustion chamber of FIG. 2b.
Figure 2C:
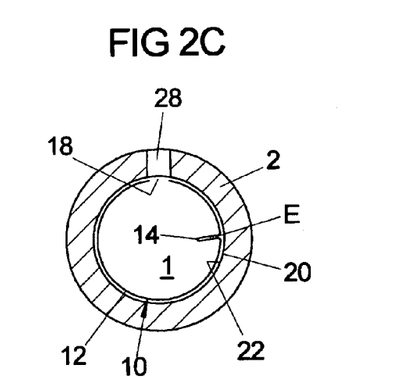
FIG. 2c shows the combustion chamber of FIG. 2a arranged in a housing receptacle according to FIG. 2b.

In the FIGS. from 2a to 2c a modification of the arrangement of the FIGS. from 1a to 1d is depicted wherein the essential difference is that an indentation 15 forming an expansion space E, according to the FIGS. 2a to 2c, is provided in the outer shell surface 12 of the combustion chamber 1 and not—as it is the case in FIGS. 1a to 1c—in the inner surface 22 of the housing receptacle 2. Thus, a section 14 of the combustion chamber housing 10 deforms here, upon insertion of the combustion chamber housing 10 into the receptacle region 20 of the housing receptacle 2 (which combustion chamber housing comprises a specific oversize with respect to the housing receptacle 2), as can be seen from FIG. 2c, into an expansion space E formed by an indentation 15 of the combustion chamber housing 10 itself, which expansion space E thus is filled—as it is also the case in FIG. 1d—at least partially with material of the combustion chamber housing 10. The section 14 to be deformed in this case thereby forms a component of the region of the combustion chamber housing 10 which is provided with an indentation 15 or at least abuts such, respectively, so that a deformation of said section 14 into the expansion space E formed by the indentation 15 is possible.

Figure 3:
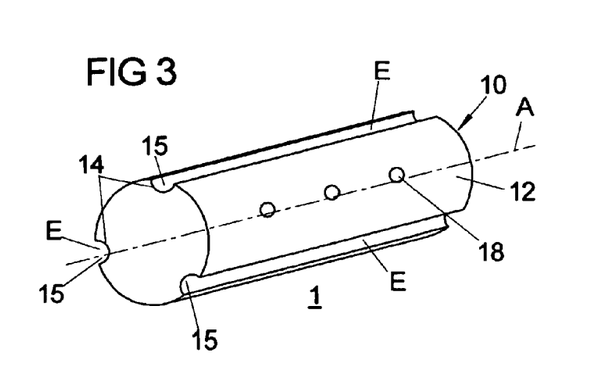

FIG. 3 finally shows a further embodiment of the combustion chamber housing 10 of FIG. 2a, in which a plurality of indentations 15 respectively forming an expansion space E and a plurality of material sections 14, respectively being deformable into a respective expansion space E, are arranged one after another along the circumference of the combustion chamber housing 10, wherein the individual material sections 14 or the indentations 15, respectively, in each case extend along the tube axis E of the combustion chamber housing 10 (and thereby over a part of its length or over its entire length).

As already mentioned, a plurality of indentations 25 may also be arranged one after another along the circumference of the receptacle region 20 of the housing receptacle 2 in the embodiments shown in FIGS. 1a to 1d, wherein then respective sections 14 to be deformed have to be provided on the outer shell surface 12 of the combustion chamber housing.

In FIGS. 4a and 4b a housing receptacle 2 for a combustion chamber 1 is depicted which housing receptacle is concretely formed on a module housing 3 for an airbag module.

The module housing 3 (e.g. comprised of plastics or of magnesium) in known manner forms a space 30 for receiving a gas bag of an airbag module, which gas bag is folded to a gas bag package, and has a base surface 32 projecting from the lateral walls of the module 3 and an open cover surface 35 being closable by the module cover and lying opposite the base surface 32. For fixation of a module cover on the module housing 3, form fitting elements 36 in the form of catch hooks are provided which project from the lateral walls of the module housing 3 in the area of the open cover surface 35.

A longitudinally extending tubular housing receptacle 2 is integrally formed on the base surface 32 of the module housing 3 which housing receptacle extends between a first and a second front side 23a, 23b and in which the combustion chamber 1 with its housing 10 is received.

The combustion chamber 1 and its housing 10, respectively, thereby do not extend along the entire length of the housing receptacle 2. In fact, the extend of the combustion chamber 1 in the direction of extension of the housing receptacle 2 is smaller than the respective extend of the housing receptacle 2 itself. This means that the two front sides 23a, 23b (axial end sections) of the housing receptacle 2 have a greater axial distance than the two front sides 13a, 13b (axial end sections) of the combustion chamber housing 10 received in the housing receptacle 2, in which combustion chamber housing 10 a propellant in the form of a solid charge L is provided.

An area on a front side 23a or an axial end section of the housing receptacle 2, respectively, remaining free serves for receiving an ignition device 7 having an igniter 72 in a housing 70 and a chamber 75 for receiving an ignition means. The igniter housing 70 is connected to a front side 13a or an axial end section of the combustion chamber housing 10, respectively (in a gas tight manner).

A distinctive feature of the arrangement depicted in the FIGS. 4a and 4b is that no independent generator housing for a gas generator separate from the module housing 3 is provided for, but that the combustion chamber 1 with its housing 10 and the propellant in the form of a solid charge L, on the one hand, and the ignition device 7, on the other hand, are rather arranged as two assembly groups in a housing receptacle 2 for the combustion chamber 1 and the ignition device 7 which housing receptacle 2 is integrally formed on the module housing 3.

A further distinctive feature is that no discharge openings for gases are initially provided for in the combustion chamber housing 10 which gases are released after ignition of the propellant arranged in the combustion chamber 1. In fact, discharge openings 28 are merely provided in the combustion chamber receptacle 2 from the very beginning through which discharge openings gases generated in the combustion chamber 1 are guided into the gas bag to be inflated.

On the combustion chamber housing, respective discharge openings 18' are only formed when, after ignition of the propellant provided in the combustion chamber 1 by means of the ignition device 7 and the generation of a gas resulting therefrom, the pressure in the combustion chamber 1 has increased so sharply that the material of the thin walled combustion chamber housing 10 bursts at those places at which it is not supported by the housing receptacle 2, thus at the sides of the discharge openings 28 on the housing receptacle which face the combustion chamber housing 10, so that the discharge openings 18' are formed which overlap with the discharge openings 28 on the housing receptacle.

Thus, the gases, released in the combustion chamber 1 after ignition of the local propellant, may flow through the just recently formed discharge openings 18' on the combustion chamber housing and the discharge openings 28 on the housing receptacle into the internal space 30 of the module housing 3 which internal space 30 serves for receiving a gas bag, wherein they are guided via a heat shield 4, a filter 5 and a diffuser 6 into the gas bag to be inflated.

Figure 5:
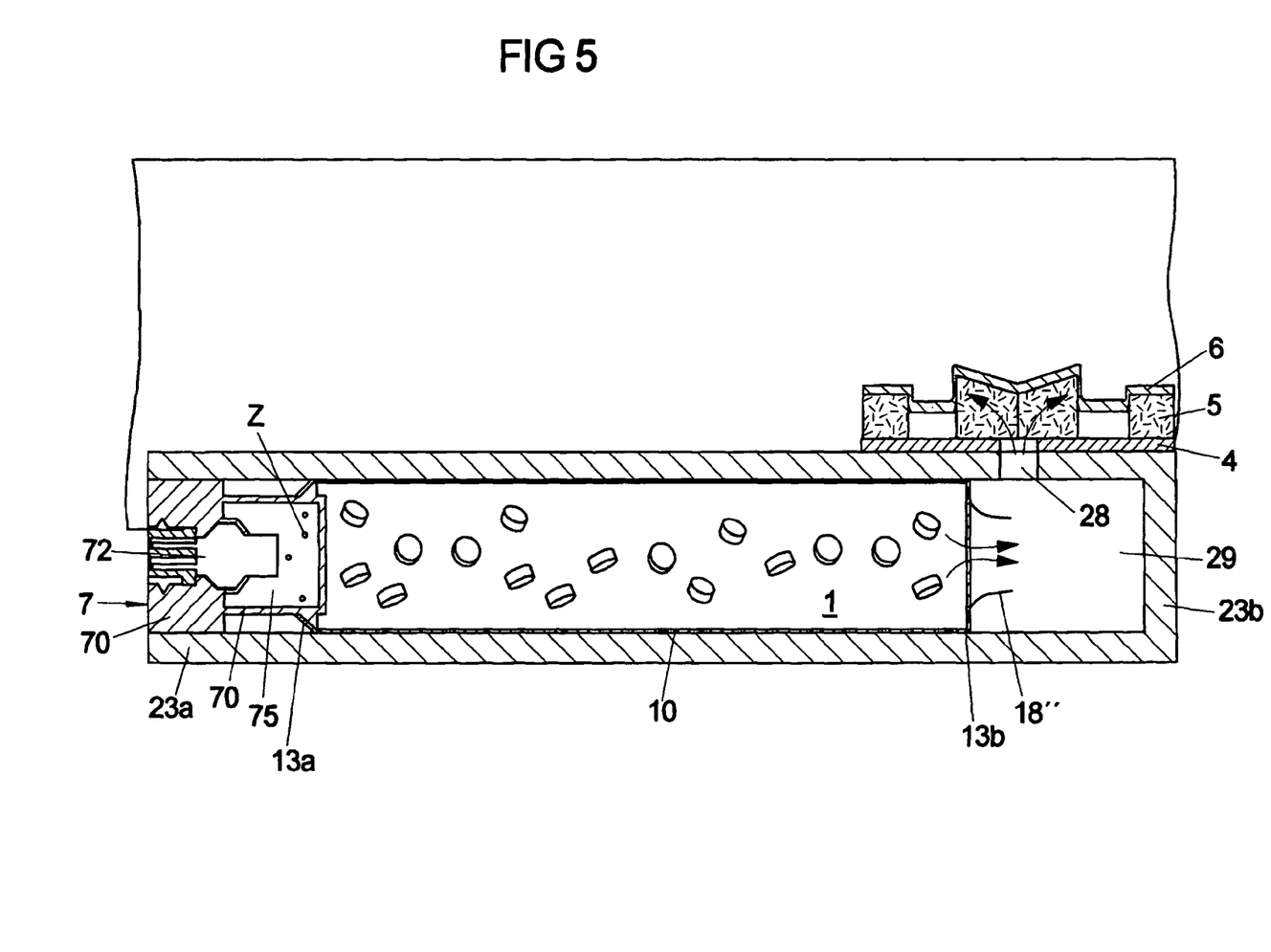
FIG. 5 shows a modification of the arrangement of FIGS. 4a and 4b in longitudinal section.

In FIG. 5 a modification of the arrangement from FIGS. 4a and 4b is depicted in which at least one discharge opening 18'' (under gas pressure) being formed in the combustion chamber housing 10 is not provided—as it is the case in FIGS. 4a and 4b—in the shell surface of the combustion chamber housing 10 but rather in such a way on the front side 13b of the combustion chamber housing 10 that the gases generated in the combustion chamber 1 may discharge there through along the tube axis defined by the combustion chamber 1.

Whereas the discharge openings 18, 18' of the combustion chamber housing 10 in the above discussed embodiments are in each case formed on its shell surface in such a way that the gases from said discharge openings 18, 18' discharge respectively in radial direction with respect to the tube axis defined by the combustion chamber housing 10, at least one discharge opening 18'' in the embodiment shown in FIG. 5 is arranged on a front side on the combustion chamber housing 10 in such a way that gases generated in the combustion chamber 1 may discharge through this discharge opening 18'' in axial direction (along the tube axis). They then arrive in a chamber 24 provided at the front side 23b of the housing receptacle 2 from which chamber they may flow through at least one discharge opening 28 on the housing receptacle (in radial direction) into a gas bag to be inflated, and indeed again via a heat shield 4, a filter 5 and a diffuser 6. Said chamber 24 thereby lies adjacent next to the front side 13b of the combustion chamber housing 10 in which the at least one discharge opening 18'' on the combustion chamber housing is formed due to the gas pressure of the gases generated in the combustion chamber 1.

The priority application, German Patent Application No. 10 2007 046 822.0, filed Sep. 26, 2007, including the specification, drawings, claims and abstract, is incorporated herein by reference in its entirety.

What is claimed is:

1. A combustion chamber unit for an airbag module of a motor vehicle, comprising:
    a combustion chamber housing enclosing a combustion chamber; and
    a housing receptacle in which the combustion chamber housing is to be arranged in such a way that the combustion chamber housing extends with its outer surface along an inner surface of the housing receptacle, wherein discharge regions are provided in the combustion chamber housing and in the housing receptacle, the discharge regions, by the arrangement of the combustion chamber housing in the housing receptacle are spatially associated with one another in such a way that gas generated in the combustion chamber can discharge through the discharge regions of the combustion chamber housing and of the housing receptacle in order to inflate a gas bag,
    wherein at least one indentation is formed on the combustion chamber housing and/or on the housing receptacle in such a way that an expansion space is defined in an area of the indentation between the outer surface of the combustion chamber housing and the inner surface of the housing receptacle, the expansion space, upon arranging the combustion chamber housing in the housing receptacle and by deformation of a section of the combustion chamber housing, is at least partially filled with material from said section of the combustion chamber housing.

2. The combustion chamber unit according to claim 1, wherein the combustion chamber housing is dimensioned with respect to the housing receptacle such that the inner surface of the housing receptacle, upon arranging the combustion chamber housing in the housing receptacle, exerts a pressure directed inwards on the outer surface of the combustion chamber housing and the combustion chamber housing in at least one section is thereby deformed into the associated expansion space.

3. The combustion chamber unit according to claim 1, wherein the deformation of the combustion chamber housing is concentrated on sections of the combustion chamber housing which can be deformed into an expansion space by means of the combustion chamber housing abutting with its outer surface on an inner surface of the housing receptacle outside the sections of the combustion chamber housing which can be deformed.

4. The combustion chamber unit according to claim 1, wherein the at least one indentation forms a depression at the inner surface of the housing receptacle, and wherein a section of the combustion chamber housing is deformable into the depression.

5. The combustion chamber unit according to claim 1, wherein the at least one indentation forms a depression at the outer surface of the combustion chamber housing, and wherein a section of the combustion chamber housing is deformable into the depression.

6. The combustion chamber unit according to claim 1, wherein the combustion chamber housing comprises a tubular outer shell surface.

7. The combustion chamber unit according to claim 6, wherein the indentation extends along the axis of the tubular outer shell surface.

8. The combustion chamber unit according to claim 1, wherein the housing receptacle has a greater stability against the pressure of gases generated in the combustion chamber than the combustion chamber housing so that the combustion chamber housing under the influence of the pressure of the gases generated in the combustion chamber can be stabilized in that the combustion chamber housing rests with its outer surface on the inner surface of the housing receptacle.

9. The combustion chamber unit according to claim 1, wherein discharge openings forming the discharge regions are provided in the combustion chamber housing and in the housing receptacle already before the generation of a gas in the combustion chamber.

10. The combustion chamber unit according to claim 1, wherein the discharge regions are formed by discharge openings and discharge openings are already provided in the housing receptacle before the generation of a gas in the combustion chamber and that discharge openings are only formed by means of the pressure of the gases generated in the combustion chamber.

11. The combustion chamber unit according to claim 1, wherein the discharge regions of the combustion chamber housing on the one hand and of the housing receptacle on the other hand at least partially overlap each other.

12. The combustion chamber unit according to claim 1, wherein the at least one indentation is free of discharge regions.

13. The combustion chamber unit according to claim 1, wherein the at least one section of the combustion chamber housing to be deformed is free of discharge regions.

14. The combustion chamber unit according to claim 1, wherein the housing receptacle forms an integral component of a module housing of the airbag module.

15. The combustion chamber unit according to claim 1, further comprising an ignition device for ignition of a propellant provided in the combustion chamber, and wherein the combustion chamber and the ignition device are connected to each other as separate assembly groups.

16. The combustion chamber unit according to claim 15, wherein the combustion chamber and the ignition device are arranged in the housing receptacle integrally formed on a module housing of the airbag module.

17. A combustion chamber unit for an airbag module of a motor vehicle, comprising:
    a combustion chamber housing enclosing a combustion chamber; and
    a housing receptacle in which the combustion chamber housing is to be arranged in such a way that the combustion chamber housing extends with its outer surface along an inner surface of the housing receptacle, wherein discharge regions are provided in the combustion chamber housing and in the housing receptacle, the discharge regions, by the arrangement of the combustion chamber housing in the housing receptacle are spatially associated with one another in such a way that gas generated in the combustion chamber can discharge through the discharge regions of the combustion chamber housing and of the housing receptacle in order to inflate a gas bag,
    wherein at least one indentation is formed on the combustion chamber housing and/or on the housing receptacle in such a way that an expansion space is defined in an area of the indentation between the outer surface of the combustion chamber housing and the inner surface of the housing receptacle, the expansion space, upon arranging the combustion chamber housing in the housing receptacle and by deformation of a section of the combustion chamber housing, is at least partially filled with material from said section of the combustion chamber housing, wherein several indentations spaced apart from each other are provided which in each case define an expansion space into which one section of the combustion chamber housing is respectively deformable.

18. A combustion chamber unit for an airbag module of a motor vehicle, comprising:

a combustion chamber housing enclosing a combustion chamber; and a housing receptacle in which the combustion chamber housing is to be arranged in such a way that the combustion chamber housing extends with its outer surface along an inner surface of the housing receptacle, wherein discharge regions are provided in the combustion chamber housing and in the housing receptacle, the discharge regions, by the arrangement of the combustion chamber housing in the housing receptacle are spatially associated with one another in such a way that gas generated in the combustion chamber can discharge through the discharge regions of the combustion chamber housing and of the housing receptacle in order to inflate a gas bag, wherein the combustion chamber housing is inserted into the housing receptacle along a longitudinal axis of the housing receptacle, wherein at least one indentation is formed on the combustion chamber housing and/or on the housing receptacle in such a way that an expansion space is defined in an area of the indentation between the outer surface of the combustion chamber housing and the inner surface of the housing receptacle, the expansion space, upon arranging the combustion chamber housing in the housing receptacle and by deformation of a section of the combustion chamber housing, is at least partially filled with material from said section of the combustion chamber housing, and wherein upon insertion of the combustion chamber housing into the housing receptacle, the inner surface of the housing receptacle exerts a force on the outer surface of the combustion chamber housing inwards in a radial direction with respect to a longitudinal axis so that said section of the combustion chamber housing is deformed into the expansion space in the radial direction.

* * * * *